United States Patent [19]
Takizawa

[11] Patent Number: 5,828,411
[45] Date of Patent: Oct. 27, 1998

[54] LOW BIT RATE CODER FOR STILL AND MOTION IMAGES USING SUB-SAMPLING

[75] Inventor: Masaaki Takizawa, Tokyo, Japan

[73] Assignee: Hitachi, Ltd., Tokyo, Japan

[21] Appl. No.: 237,340

[22] Filed: May 3, 1994

Related U.S. Application Data

[63] Continuation of Ser. No. 868,510, Apr. 15, 1992, abandoned.

[51] Int. Cl.$^6$ .................................................. H04N 7/32
[52] U.S. Cl. ......................................... 348/415; 348/424
[58] Field of Search .................................... 358/133, 134, 358/138; 348/399, 397, 424, 425, 390, 384, 409, 415, 416, 402, 401, 400

[56] References Cited

U.S. PATENT DOCUMENTS

| | | | |
|---|---|---|---|
| 4,261,018 | 4/1981 | Knowlton | 358/133 |
| 4,692,801 | 9/1987 | Ninomiya et al. | 358/133 |
| 4,703,353 | 10/1987 | David | 358/138 |
| 4,774,562 | 9/1988 | Chen | 358/133 |
| 4,802,005 | 1/1989 | Kondo | 358/138 |
| 4,873,573 | 10/1989 | Thomas | 358/133 |
| 4,924,311 | 5/1990 | Ohki et al. | 358/138 |
| 5,050,230 | 9/1991 | Jones | 358/133 |
| 5,130,797 | 7/1992 | Murakami | 358/133 |
| 5,142,362 | 8/1992 | Masera et al. | 358/133 |

FOREIGN PATENT DOCUMENTS 60-127875 7/1985 Japan .
62269488 11/1987 Japan .

*Primary Examiner*—Bryan Tung
*Attorney, Agent, or Firm*—Antonelli, Terry, Stout & Kraus, LLP

[57] ABSTRACT

A low bit rate coding apparatus is made up of: a circuit for storing at least a television input signal of a single screen; a circuit for sub-sampling the stored television input signal at a predetermined time period to read out the sub-sampled television input signal; a circuit for coding the read television input signal at a low bit rate; and a circuit in which, after the television input signal of a single screen has been sub-sampled and read out, and the low bit rate coding operation has been carried out, the television input signal is again read out at a different sub-sampling position and low-bit-rate coded.

4 Claims, 1 Drawing Sheet

LOW BIT RATE CODER FOR STILL AND MOTION IMAGES USING SUB-SAMPLING

This application is a continuation application of Ser. No. 07/868,510, filed Apr. 15, 1992, now abandoned.

BACKGROUND OF THE INVENTION

The present invention relates to a low bit rate coding operation or high efficiency coding operation of a television signal (will be referred to as "TV signal") and, more specifically, to a system in which TV signals having different resolutions are transmitted by a single TV signal low bit rate coding apparatus.

Since a TV signal has a wide frequency band, if a TV signal is converted into a digital signal and then this digital signal is directly transmitted, a high transmission speed is required. In order to lower this transmission speed, TV signal low bit rate coding apparatuses for compressing redundancy of the TV signals have been developed.

The redundancy of the TV signals may be mainly classified into the two following sorts.
(1) TV signals within a screen image are mutually resembled with each other. In particular, it is known that a difference between adjoining TV signals is extremely small at a smooth screen image.
(2) TV signals of a continuous screen image are mutually resembled with each other. More specifically, it is known that a difference between screen images is very small in case an object to be imaged stands still.

Low bit rate coding apparatuses predict a TV signal to be transmitted based upon a transmitted TV signal by utilizing these correlations, and low-bit-rate code a difference of the signals thereof (prediction error).

TV signals to be transmitted are classified into both "a moving picture" such as a human image, and also "a still image" such as paintings and calligraphic works. Statistical characteristics and required image qualities of these pictures are different from each other. Therefore, two different sorts of CODEC, namely for a moving picture as well as a still picture, have been developed.

In other words, as the statistical characteristics, it is known that there is a great correlation between a screen image which has been newly transmitted and a screen which will be transmitted. Also, as the required image quality, although relatively low resolution is spatially allowed, a relatively large quantity of frames (will be referred to as a frame frequency) per second, for instance, 10 frames/second are required so as to reproduce better movements.

Thus, in the TV CODEC for the moving picture,
(1) in order to utilize a correlation between a preceding screen and a present screen, a so-called "interframe prediction" (i.e., instead of transmitting a TV signal of an original screen image, a difference between the TV signal of original screen and the predicted value from the preceding screen, namely a prediction error is transmitted) is employed.
(2) The quantity of signals occurring every screen image is reduced by relatively lowering resolution, and the frame frequency is there by improved.

A still picture has a statistical characteristic that is opposite to that of the moving picture, and it is known that no correlation is present, generally speaking, between a newly transmitted screen image and a present screen image. With respect to the image quality, in order that the contents of the paintings and calligraphic works are sufficiently transmitted, relatively high resolution is required.

Thus, in the low bit rate coding apparatus used for still pictures,
(1) a so-called "intraframe prediction" is employed without utilizing a correlation between a preceding screen and a present screen, but rather a difference from a value predicted from a signal of a scanning line being coded or from scanning line just above which has been transmitted.
(2) By allowing a time period required for transmitting one screen to become longer, high resolution is set.

As explained above, since correlation between the preceding screen and the present screen is not utilized and also the resolution is high as to the still picture, a time period during which one screen is transmitted is prolonged, which may cause psychological burden to TV viewers. In view of such, the below-mentioned method (hierarchical coding operation) as disclosed in, for instance, JP-A-60-127875 (coding method for facsimile image) is known.
(1) As shown in FIG. 3, an image signal is sub-sampled and only an image signal represented by symbol ⊙ is transmitted.
(2) Subsequently, image signals ○, ● and x which have not yet been transmitted, are predicted by way of the interpolation operation based on the transmitted image signal ⊙, and a difference (prediction error) between this predicted value and an actual value is transmitted.
(3) At the receiving end, since the image signal ⊙, which has been first sub-sampled and transmitted, is displayed and an outline can be reported at an earlier stage to the TV viewers, the psychological burden given to the TV viewers can be reduced or mitigated.

Because of such features, both of the low bit rate coding apparatuses for the moving picture and the still picture have been separately developed and used on a non-experimental basis.

In practice it is often the case that both a still image signal and a moving image signal are transmitted by changing from the still image signal to the moving image signal, or vice versa. In this case, conventionally two low bit rate coding apparatuses for the moving picture and the still picture are needed to be prepared and changed over so as to low-bit-rate code the signals. As a result, there are problems that costs and installation areas of these coding apparatuses were increased.

SUMMARY OF THE INVENTION

An object of the present invention is to transmit images with different resolution, such as a moving picture image, and a still picture image by way of a single low bit rate coding apparatus.

To achieve the above-described object, the present invention is characterized by comprising:
means for storing a TV signal of at least a single screen image;
sub-sample means for discretely reading out the stored TV signal at a predetermined time period;
means for low-bit-rate coding the sub-sampled and read out TV signal; and
means for reading out the TV signal at sub-sampling positions which are changed, and then for low-bit-rate coding the TV signal after the TV signal of a single screen image has been sub-sampled to be read out and low-bit-rate coded.

With the above-described means, the low bit rate coding operation may be completed by reading once a single screen in case of low resolution by a low bit rate coding apparatus which has been designed for the low resolution at relatively low cost. In case that an image with high resolution is transmitted, the image can be transmitted by sub-sampling the image to be read out, while positions are varied at low resolution only when necessary.

DESCRIPTION OF THE PREFERRED EMBODIMENTS

Figure 1:
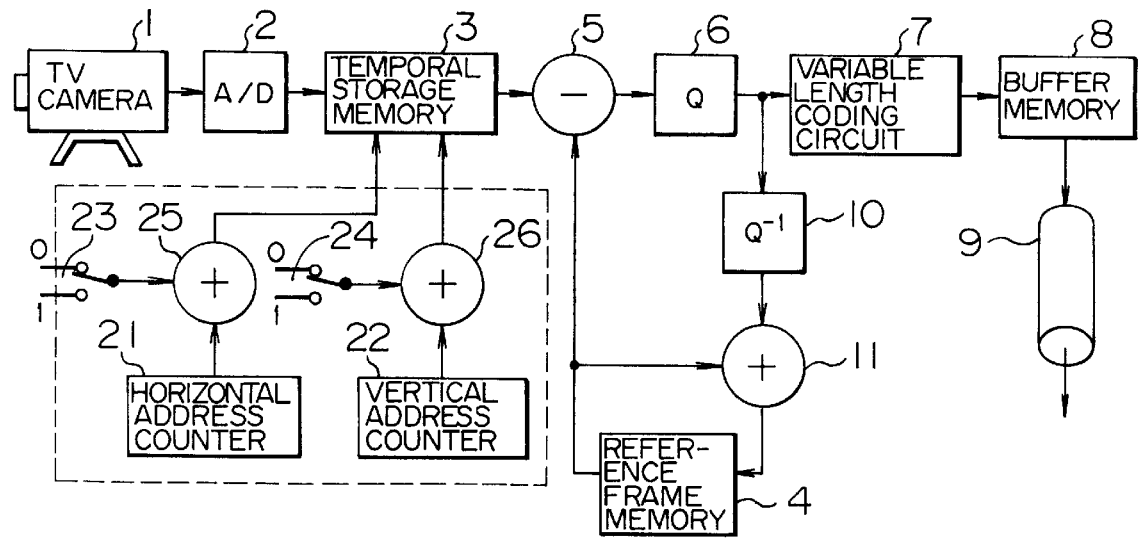
FIG. 1 is a schematic block diagram of a coding apparatus for a moving picture according to a preferred embodiment of the present invention.

Referring now to FIG. 1, preferred embodiments of the present invention will be described. In the drawing, only the area surrounded by a dotted line is related to the present invention, and other portions correspond to a block arrangement of the conventional interframe predictive coding apparatus.

An overall arrangement of the conventional portion will now be briefly explained.

(1) A TV signal imaged by a TV camera is scanned in a scanning line direction, and converted by an analog-to-digital converter 2 into a digital signal which is temporarily stored into a temporal storage memory 3 (the digitized TV signal will be simply referred to as a "TV signal").

(2) The TV signal of this temporal storage memory 3 is subtracted from a TV signal of the previous frame, which has been stored into a reference frame memory 4, by a subtraction circuit 5, thereby obtaining a prediction error. The prediction error is quantized by a quantizing circuit 6.

(3) To the quantized signals, optimum coding word lengths corresponding to occurring frequencies of the quantized signals are allocated by a variable length coding circuit 7. This coding word is smoothed by a buffer memory 8 along a temporal direction and then sent out at a constant speed to a transmission path 9.

(4) At the same time the above-described process is being performed, after the signal quantized by the quantizing circuit 6 has been inverse-quantized by a inverse-quantizing circuit 10, the resultant signal is added to the above-described TV signal of the previous frame by an adder circuit 11, and then is stored into the reference frame memory 4. The stored signal is used to predict a screen image later.

Figure 2:
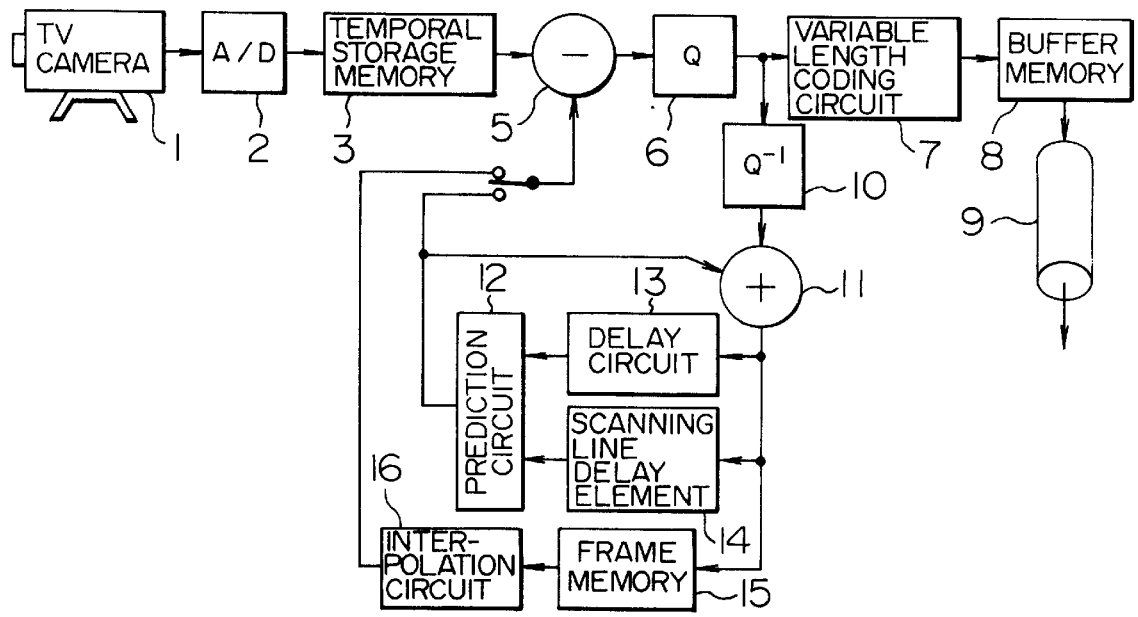
FIG. 2 is a schematic block diagram of the conventional coding apparatus for a still picture.

Next, an overall arrangement of the conventional low bit rate coding apparatus for still pictures will now be briefly described with reference to FIG. 2. It should be noted that the circuit elements indicated by the same reference numerals as those in FIG. 1 have the same functions.

(1) A TV signal imaged by the TV camera 1 is scanned in the scanning line direction, and converted by an analog-to-digital converter 2 into a pixel signal which will be stored into the temporal storage memory 3.

(2) A prediction circuit 12 produces a prediction signal from either an output of a delay circuit 13 which corresponds to a transmitted signal within the same scanning line as the pixels to be predicted or an output of a delay circuit 14 which corresponds to a signal of a scanning line just above the pixels to be predicted. A difference circuit 5 calculates a difference between the TV signal stored in this temporal storage memory 3 and this prediction value. The difference is quantized by the quantizing circuit 6.

(3) To the quantized signals, optimum coding word lengths corresponding to occurring degrees of the quantized signals are allocated by the variable length coding circuit 7. The coding words are smoothed by the buffer memory 8 along the temporal direction, and are transferred at a constant speed to the transmission path.

(4) At the same time as the above-described process is being carried out, after the signal quantized by the quantizing circuit 6 has been inverse-quantized by the inverse-quantizing circuit 10, the resultant signal is added to the above-described prediction value and stored into the delay circuit 13 and the scanning line delay element 14. These signals are used for predicting the TV signals at a later stage.

Generally speaking, since resolution of a still picture is high, a long time period is required to transmit a single screen image. Then, a psychological burden may be imposed upon TV viewers.

Accordingly, the below-mentioned, so-called "hierarchical coding operation" method has been employed for the still picture image.

(1) The TV signal is read in the temporal storage memory 3 at high resolution, and (2) first, is sub-sampled at low resolution, and then read out. Then, the TV signal read out is quantized in the quantizing circuit 6 and is variable-length-coded by the variable length coding circuit 7, and thereafter is transmitted.

(3) After the signal quantized in the above (2) has been inverse-quantized by the inverse-quantizing circuit 10, the resultant signal is added with the prediction value by the adder circuit 11, and then is stored in the frame memory 15.

(4) An interpolation circuit 16 predicts TV signals which have not been transmitted by interpolating the TV signals stored in the frame memory. The resultant predicted signals are read out via a switch 17, and a difference between the predicted signals and the TV signals not transmitted at the above (2) is calculated by a subtraction circuit 5, and thus are low-bit-rate coded. The subsequent operations are the same as those of the above (2).

(5) Since an outline of the TV signals can be quickly transmitted to the TV viewers by displaying the TV signals transmitted at the above (2) at the receiving side, the psychological burdens imposed upon the TV viewers can be mitigated.

The overall construction of the conventional low bit rate coding apparatus used for both the moving picture and the still picture has been briefly described. As apparent from these figures, it may be asserted that the low bit rate coding apparatus used for the moving picture is very similar to that of the still picture.

Subsequently, the circuit portion surrounded by the dotted line of FIG. 1 and related to the present invention will now be described more in detail. In the above-described explanation, for the sake of simplicity, it is assumed that both the temporal storage memory 3 and the reference frame memory 4 are mutually capable of storing the TV signals having the same resolution. In contrast thereto, according to the present invention, it should be noted that the temporal storage memory 3 stores such a TV signal having twice the resolution, as compared with that of the reference frame memory. For example, each of the horizontal and vertical directions, are 4 times higher than that of the reference frame memory.

A horizontal address counter 21 and a vertical address counter 22, corresponding to the conventional temporal storage memory 3 and the conventional reference frame memory 4 respectively, are advanced one by one from 0 to 1, 2 and 3, . . . in the horizontal/vertical directions.

In contrast, address counters of the temporal storage memory 3 according to the present invention are advanced two by two from 0 to 2, 4, 6, . . . respectively.

Figure 3:
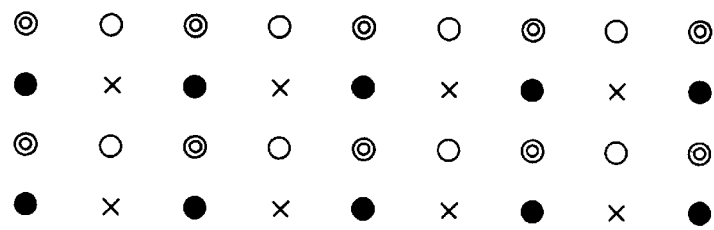
FIG. 3 schematically represents a sequence of a TV signal to be transmitted, for explaining a hierarchical coding operation.

Under such conditions, in accordance with the present invention, in case of low resolution, since both of the switches 23 and 24 are connected to "0" sides, and "0" is input to the adder circuits 25 and 26, the values of the address counters are directly input to the temporal storage memory 3. As a result, only the TV signals at an even address (indicated by a symbol ⊙ shown in FIG. 3) are sub-sampled, read out and low-bit-rate coded.

Also, in case of high resolution, the switches 23 and 24 are connected to "0" in a similar manner to that of the low resolution at the beginning, so that only the TV signals at the even address (represented by symbol ⊙ shown in FIG. 3) are sampled and read out. A difference is calculated between the read out signals and the TV signals of the preceding frame which have been stored in the reference frame memory 4, the difference is quantized by the quantizing circuit 6, and the coding words are allocated by the variable length coding circuit 7. Thereafter, the resultant TV signals are sent out to the transmission path 9.

It should be noted that the quantized signals may be inverse-quantized by the inverse-quantizing circuit 10; the inverse-quantized signals may be added to the TV signals of preceding frame, which have been read out from the reference frame memory 4, in the adder circuit 11, and the added signals may again be stored into the reference frame memory 4. For the sake of simplicity, this operation may be omitted.

Next, for instance, only the switch 23 is connected to "1", and only the TV signals (indicated by symbol ○ shown in FIG. 3) at an odd address in the horizontal direction, and at the even address in the vertical direction are sub-sampled to be read out. A difference between the read out signals and the TV signals which have been stored in the reference frame memory 4 is calculated, quantized and allocated by the coding words, and thereafter the resultant signals are sent to the transmission path 9.

By repeating this operation, all of the TV signals with high resolution (indicated by symbols ⊙, ○, ●, x shown in FIG. 3) which have been stored in the temporal storage memory 3 can be read out and transmitted with the low bit rate coding operation.

When the signals which have been sub-sampled at first and transmitted are displayed at the receiving end, and subsequently the signals which have been sub-sampled at different positions are successively displayed, since outlines of paintings and calligraphic works may be transmitted to the TV viewers at an earlier stage in a similar manner to the conventional hierarchical coding operation of the still images, psychological burdens imposed upon TV viewers may be mitigated.

It should be noted that as apparent from the foregoing descriptions, the following modifications may be covered by the present invention.

(1) Although the above-described preferred embodiments are premised on the use of the interframe coding operation, a so-called "motion compensation interframe prediction" may be utilized with similar advantages in which amounts of motion of an object among frames and the like are measured, and after the motion amounts are compensated, the interframe prediction is carried out.

(2) A plurality of prediction error signals, after the interframe prediction has been carried out, may be combined as a signal block. Then, after the signal block may be quadrature-converted, the quadrature-converted signals block may be quantized. Furthermore, the prediction error signals combined as the signal block may be vector-quantized.

(3) Although the ratio of the high resolution to the low resolution of the TV signals is selected to 2:1 in both of the horizontal direction and the vertical direction in the above-described preferred embodiments, this ratio may be arbitrarily determined.

Considering the circuit scale, the consideration results are obtained as follows:

(1) In accordance with the present invention, the TV signals with the high resolution can be transmitted without modifying other circuit portions only by increasing the memory capacity of the temporal storage memory 3 in the low bit rate coding apparatus for the low resolution and varying the address control method of this memory. It has been relatively easy to increase a memory capacity of a temporal storage memory due to recent improvements in semiconductor memory technology. As a result, an increase of the circuit scale becomes small.

(2) In comparison with "the low bit rate coding apparatus for the still picture, employing the hierarchical coding operation", the present invention is advantageous in that "the interpolation circuit 16 for interpolating the TV signals which have been not transmitted, based upon the TV signals transmitted at the low resolution", which is necessarily required in the hierarchical coding operation, is no longer required.

Next, considering the qualities of the transmitted images and also the psychological burden imposed upon the TV viewers, the consideration results are given as follows:

(1) In case TV signals with high resolution are transmitted, since the TV signals are first transmitted at low resolution even in the present invention, the psychological burden imposed upon the TV viewers may be reduced similarly to that of the hierarchical coding operation.

(2) When the moving picture is changed over to the still picture, it is often the case that the positioning operations of paintings and calligraphic works are first carried out in the moving picture mode, and thereafter the paintings and calligraphic works are transmitted at high resolution in the still image mode.

According to the present invention, since the TV signals (note: low resolution, because they are sub-sampled and read out) at the same positions as the screen image to be transmitted have been stored in the reference frame memory 4 by the moving picture mode, when the image mode is changed over to the still image mode, only the difference between the TV signals and this reference frame memory 4 may be transmitted. As a result, the TV signals can be low-bit-rate coded, as compared to the TV signals of the still pictures that are directly transmitted without calculating the differences between these TV signals and the preceding frame. As a consequence, the still picture can be transmitted to the receiving end in a shorter time period, so that the psychological burden imposed upon the TV viewers can be reduced.

As a result of the above-described considerations, the present invention may provide such great practical merits.

I claim:

1. A coding apparatus for coding input video signals depending upon a type of picture image of the input video signals, comprising:

storing means for successively receiving a number of frames of a digitized input video signal and storing samples of at least one frame of said digitized input video signal;

sub-sampling means for producing an output digitized video signal for each frame by sub-sampling a set of reduced number of samples for each frame among said stored samples;

coding means for receiving said output digitized video signal and coding the received output digitized video signal into a low bit rate video signal by executing interframe predictions, combining a plurality of prediction error signals as a signal block, quadrature-converting the signal block and quantizing the quadrature-converted signal block; and means for controlling said sub-sampling means in accordance with a type of picture image represented by said input video signal so as to produce, as said output digitized video signal for each frame, a set of samples sub-sampled in a fixed sampling mode in which sampling points are fixed over successive frames when the input video signal is a moving picture image, and to periodically produce different sets of samples, a predetermined number of frames a cycle, sub-sampled in a variable sample mode in which portions of sampling points are varied over successive frames within the cycle when the input video signal is a still picture image, wherein said coding means receives different sets of samples depending upon the type of picture image of the input video signals.

2. A coding apparatus for coding input video signal depending upon a type of picture image carried by the input video signal comprising:

memory means for successively receiving a number of frames of a digitized input video signal and storing samples of at least one frame of said digitized input video signal;

access means, connected to said memory means, for producing an output digitized video signal for each frame by reading out from said memory means a set of reduced number of samples for each frame sub-sampled among said stored samples; and coding means for receiving said output digitized video signal and coding the received output digitized video signal into a low bit rate video signal by executing interframe prediction, combining a plurality of prediction error signals as a signal block, quadrature-converting the signal block and quantizing the quadrature-converted signal block;

said access means being provided with switching means for changing an access pattern in accordance with a type of picture image represented by said input video signal so as to produce, as said output digitized video signal for each frame, a set of samples sub-sampled in a fixed sampling sequence in which sampling points are fixed over successive frames when the input video signal is for a moving picture image, and to periodically produce different sets of samples, a predetermined number of frames a cycle, sub-sampled in a variable sample sequence in which portions of sampling points are varied over successive frames within the cycle when the input video signal is a still picture image, wherein said coding means processes both of still picture image video signals and moving image picture video signals supplied from said sub-sampling means.

3. A low bit rate coding apparatus for selectively coding input video signal depending upon a kind of picture image represented by the input video signal, comprising:

storing means for successively receiving a number of frames of a digitized input video signal and storing at least one frame of samples of said digitized input video signal;

sub-sampling means for producing a low resolution output video signal for each frame by sub-sampling a set of samples located within a predetermined interval among said stored samples for each frame;

coding means for low bit rate coding said output video signal from said sub-sampling means by executing interframe prediction, combining a plurality of prediction error signals as a signal block, quadrature-converting the signal block and quantizing the quadrature-converted signal block; and means for controlling a starting point of sub-sampling operations for each frame in accordance with a type of image represented by said input video signal so that said sub-sampling means repeats a sequence of sub-sampling operations, a predetermined number of frames a cycle, by periodically shifting the portions of a starting point of sub-sampling operations for each frame when the input video signal is a still picture image to successively produce a predetermined number of frames of output video signals having different sets of samples, and controlling sub-sampling operations to begin at a fixed starting point when the input video signal is a moving picture image to successively produce output video signals each having the same set of samples for each frame.

4. A coding apparatus for coding input video signals depending upon a type of picture image of the input video signals, comprising:

a memory operatively connected to successively receive a number of frames of digitized input video signals and having storage capacity to store a predetermined number of samples of at least one frame of said digitized input video signals;

a sub-sampling circuit, coupled to said memory, to periodically generate a sequence of read addresses for said memory in such a manner that said memory produces, as an output digitized video signal for each frame, a set of reduced number of samples for each frame sub-sampled among said stored samples;

a coding circuit connected to said memory and having a coding function to convert said output digitized video signal into a low bit rate video signal by executing interframe prediction, combining a plurality of prediction error signals as a signal block, quadrature-converting the signal block and quantizing the quadrature-converted signal block; and a control circuit, coupled to said sub-sampling circuit, to control the sequence of said read addresses in accordance with a type of picture image represented by said input video signal in such a manner that when the input video signal is for a moving picture image, a set of samples are sub-sampled in a same sampling pattern for each frame as that in a preceding frame, and when the input video signal is a still picture image, different sets of samples are periodically sub-sampled at different starting positions a predetermined number of frames a cycle, wherein said coding circuit receives different sets of samples depending upon the type of picture image of the input video signals.

* * * * *